US008919105B2

(12) United States Patent
Takayanagi et al.

(10) Patent No.: US 8,919,105 B2
(45) Date of Patent: Dec. 30, 2014

(54) DPF REGENERATION CONTROL DEVICE, DPF REGENERATION CONTROL METHOD, AND DPF REGENERATION SUPPORT SYSTEM

(75) Inventors: Ko Takayanagi, Tokyo (JP); Tomotsugu Masuda, Tokyo (JP); Yasumichi Aoki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 165 days.

(21) Appl. No.: 13/581,957

(22) PCT Filed: Jan. 26, 2011

(86) PCT No.: PCT/JP2011/051512
§ 371 (c)(1),
(2), (4) Date: Sep. 19, 2012

(87) PCT Pub. No.: WO2011/118250
PCT Pub. Date: Sep. 29, 2011

(65) Prior Publication Data
US 2013/0000282 A1 Jan. 3, 2013

(30) Foreign Application Priority Data

Mar. 25, 2010 (JP) ................................. 2010-070121

(51) Int. Cl.
*F01N 3/00* (2006.01)
*B01D 46/44* (2006.01)
(Continued)

(52) U.S. Cl.
CPC .......... *B01D 46/446* (2013.01); *B01D 46/0086* (2013.01); *B01D 53/944* (2013.01);
(Continued)

(58) Field of Classification Search
CPC ............ B01D 46/0086; B01D 46/446; B01D 53/944; B01D 53/96; B01D 53/9495; B01D 2279/30; F01N 3/023; F01N 3/18; F01N 2560/08
USPC ..................................................... 60/272–324
See application file for complete search history.

(56) References Cited

U.S. PATENT DOCUMENTS 7,197,868 B2 *  4/2007  Yahata et al. .................... 60/297
7,357,822 B2 *  4/2008  Hamahata et al. .............. 55/283
(Continued)

FOREIGN PATENT DOCUMENTS

CN           2769529 Y        4/2006
CN           2900803 Y        5/2007
(Continued)

OTHER PUBLICATIONS

International Preliminary Report on Patentability and Written Opinion of the International Searching Authority issued Oct. 2, 2012 in corresponding International Application No. PCT/JP2011/051512 (with English translation).

(Continued)

Primary Examiner — Jesse Bogue
(74) Attorney, Agent, or Firm — Wenderoth, Lind & Ponack, L.L.P.

(57) ABSTRACT

A DPF regeneration control device includes: a differential pressure sensor which detects a differential pressure between a front and a rear of a DPF; a DPF differential pressure setting unit which sets a DPF differential pressure generated in accordance with a total accumulated amount of soot and ash, sets a DPF differential pressure generated when an ash accumulation amount corresponds to an accumulation amount at which washing is required, as a washing request threshold, and sets a DPF differential pressure generated when the ash accumulation amount is larger than the washing request threshold such that a reduction in output is necessary, as an output reduction threshold; a washing request issuing unit which determines whether or not the DPF differential pressure has reached the washing request threshold; and an output reduction warning unit which determines whether or not the DPF differential pressure has reached the output reduction threshold.

10 Claims, 8 Drawing Sheets

(51) Int. Cl.
  B01D 46/00 (2006.01)
  B01D 53/94 (2006.01)
  B01D 53/96 (2006.01)
  F01N 3/023 (2006.01)
  F01N 3/18 (2006.01)

(52) U.S. Cl.
  CPC ............... B01D 53/96 (2013.01); F01N 3/023 (2013.01); F01N 3/18 (2013.01); *B01D 53/9495* (2013.01); *B01D 2279/30* (2013.01); *F01N 2560/08* (2013.01)
  USPC ............... 60/295; 60/274; 60/310; 60/311

(56) References Cited

U.S. PATENT DOCUMENTS

| | | | |
|---|---|---|---|
| 7,462,222 | B2 | 12/2008 | Sellers et al. |
| 2006/0070359 | A1 | 4/2006 | Sellers et al. |
| 2007/0006577 | A1 | 1/2007 | Yokoyama et al. |
| 2010/0101409 | A1* | 4/2010 | Bromberg et al. ............... 95/8 |
| 2010/0126144 | A1* | 5/2010 | He et al. ............... 60/286 |
| 2010/0242443 | A1 | 9/2010 | Kodama et al. |

FOREIGN PATENT DOCUMENTS

| | | |
|---|---|---|
| JP | 2002-123524 | 4/2002 |
| JP | 2003-83036 | 3/2003 |
| JP | 2003-166412 | 6/2003 |
| JP | 2004-132268 | 4/2004 |
| JP | 2005-113752 | 4/2005 |
| JP | 2006-29326 | 2/2006 |
| JP | 2006-348792 | 12/2006 |
| JP | 2007-16722 | 1/2007 |
| JP | 3951618 | 8/2007 |
| JP | 2007-303334 | 11/2007 |
| JP | 4032849 | 1/2008 |
| JP | 2008-121573 | 5/2008 |
| JP | 2008-215535 | 9/2008 |
| JP | 2009-138704 | 6/2009 |

OTHER PUBLICATIONS

Notification of the First Office Action issued Jan. 24, 2014 in corresponding Chinese Application No. 201180011828.1 (with English translation).
International Search Report issued Apr. 19, 2011 in corresponding International Application No. PCT/JP2011/051512.
Office Action in corresponding Japanese Application No. 2010-070121, having a date of issue of Aug. 9, 2013 (with English translation).
Decision to grant a patent issued May 12, 2014 in corresponding Japanese Application No. 2010-070121 (with English translation).
Notice of Allowance issued Oct. 9, 2014 in corresponding Chinese Application No. 201180011828.1 (with English translation).

* cited by examiner

DPF REGENERATION CONTROL DEVICE, DPF REGENERATION CONTROL METHOD, AND DPF REGENERATION SUPPORT SYSTEM

TECHNICAL FIELD

The present invention relates to a regeneration control device, a regeneration control method, and a regeneration support system for a diesel particulate filter (to be abbreviated to DPF hereafter) that collects particulate matter (exhaust gas particulate matter; to be abbreviated to PM hereafter) contained in exhaust gas from a diesel engine, and more particularly to a regeneration control device, a regeneration control method, and a regeneration support system for estimating an accumulated amount of ash accumulated in the DPF and performing ash washing.

BACKGROUND ART

A DPF is known as an effective technique for reducing PM discharged from a diesel engine.

A DPF is a PM collecting device that uses a filter, and both a soot component and an ash component discharged from the engine accumulate in the DPF. The soot component can be burned away by forcible regeneration, but the ash cannot be burned away by forcible regeneration and therefore accumulates gradually in the DPF. When the ash accumulates, the DPF becomes blocked, leading to an increase in exhaust gas pressure, and therefore an ash accumulation amount must be predicted periodically so that ash washing can be performed.

Ash is generated when engine oil enters a combustion chamber through a gap between a cylinder and a piston and is burned therein. It is therefore known that the ash accumulation amount correlates with an engine oil consumption amount.

Various techniques are available as ash accumulation amount estimating methods. For example, Japanese Patent Application Publication No. 2003-83036 (Patent Document 1) discloses a technique of determining the ash accumulation amount from a DPF differential pressure immediately after DPF regeneration is complete, Japanese Patent Publication No. 4032849 (Patent Document 2) discloses a technique of determining the ash accumulation amount by integrating a traveled distance, Japanese Patent Publication No. 3951618 (Patent Document 3) discloses a technique of determining an ash discharge amount from a map of an engine rotation speed and a fuel consumption amount and determining the accumulation amount by integrating the determined ash discharge amount, and Japanese Patent Application Publication No. 2006-29326 (Patent Document 4) discloses a technique of detecting an oil level using an oil sensor and calculating the ash accumulation amount by integrating the detected oil level.

Patent Document 1: Japanese Patent Application Publication No. 2003-83036
Patent Document 2: Japanese Patent Publication No. 4032849
Patent Document 3: Japanese Patent Publication No. 3951618
Patent Document 4: Japanese Patent Application Publication No. 2006-29326

However, with the technique of determining the ash accumulation amount from the DPF differential pressure immediately after DPF regeneration is complete, disclosed in Patent Document 1, the DPF differential pressure does not always increase in proportion to an increase in the ash accumulation amount, and in a condition where no soot has accumulated, the DPF differential pressure substantially does not increase relative to ash accumulation. It is therefore difficult to predict the ash accumulation amount alone from the DPF differential pressure with a high degree of precision.

Further, when soot accumulates in a DPF in which ash has accumulated, the DPF differential pressure is higher than in a case where ash has not accumulated, but since the amount of accumulated soot cannot be separated from the ash accumulation amount, it is difficult to estimate the ash accumulation amount quantitatively with a high degree of accuracy.

In the case of the technique of determining the ash accumulation amount by integrating the traveled distance, disclosed in Patent Document 2, the method is simple, but conditions such as an engine load cannot be taken into account, making it difficult to achieve estimation precision.

With the technique of determining the ash discharge amount from the map of the engine rotation speed and the fuel consumption amount and determining the accumulation amount by integrating the determined ash discharge amount, disclosed in Patent Document 3, a large number of test points, and accordingly a large amount of time, are required to create the map, and it is therefore difficult to secure precision over the entire map.

Further, with the technique of detecting the oil level using an oil sensor and calculating the ash accumulation amount by integrating the detected oil level, disclosed in Patent Document 4, the need to provide the oil sensor leads to an increase in cost.

Hence, various methods exist for estimating the ash accumulation amount, but at the same time, problems remain. It is therefore necessary to provide a simple method of estimating the ash accumulation amount precisely without an increase in cost.

Furthermore, ash, in contrast to soot, does not have carbon as a main component, and instead mainly contains components derived from metal-based additives contained in the engine oil. Therefore, the ash cannot be incinerated by combustion and must instead be washed, i.e. blown away by compressed air or the like. For this purpose, an operation must be performed in a dedicated service station having a washing facility.

Hence, a DPF regeneration support system that can issue an ash washing request to an operator accurately so that ash washing can be performed efficiently at a service station is also required.

DISCLOSURE OF THE INVENTION

The present invention has been designed in consideration of these problems, and an object thereof is to provide a DPF regeneration control device, a DPF regeneration control method, and a DPF regeneration support system with which an ash accumulation amount can be estimated precisely using a simple method and an ash washing request can be issued to an operator accurately so that ash washing can be performed efficiently at a service station.

To solve the problems described above, a DPF regeneration control device according to a first invention is a DPF regeneration control device for a diesel particulate filter (DPF) that is provided in an exhaust passage and collects exhaust gas particulate matter (PM), the DPF regeneration control device including: a forcible regeneration unit which forcibly regenerates the PM collected in the DPF; a differential pressure detection unit which detects a differential pressure between a front and a rear of the DPF; a DPF differential pressure setting unit which sets a DPF differential pressure generated in accordance with a total accumulated amount of soot and ash in advance through an experiment or a calculation, sets a DPF differential pressure generated when an ash accumulation amount corresponds to an accumulation amount at which washing is required, as a washing request threshold, and sets a DPF differential pressure generated when the ash accumulation amount is larger than the accumulation amount at which washing is required such that a reduction in output is necessary, as an output reduction threshold; a washing request issuing unit which determines whether or not the DPF differential pressure has reached the washing request threshold and outputs a washing request when the DPF differential pressure has reached the washing request threshold; and an output reduction warning unit which determines whether or not the DPF differential pressure has reached the output reduction threshold, which is larger than the washing request threshold, and issues an output reduction warning when the DPF differential pressure has reached the output reduction threshold.

A DPF regeneration control method according to a second invention is a DPF regeneration control method for a diesel particulate filter (DPF) that is provided in an exhaust passage and collects exhaust gas particulate matter (PM), using a forcible regeneration unit which forcibly regenerates the PM collected in the DPF, the DPF regeneration control method including: a washing request issuing step of setting a DPF differential pressure generated in accordance with a total accumulated amount of soot and ash in advance through an experiment or a calculation, setting a DPF differential pressure generated when an ash accumulation amount corresponds to an accumulation amount at which washing is required, as a washing request threshold, setting a DPF differential pressure generated when the ash accumulation amount is larger than the accumulation amount at which washing is required such that a reduction in output is necessary, as an output reduction threshold, and determining whether or not the DPF differential pressure has reached the washing request threshold and outputting a washing request when the DPF differential pressure has reached the washing request threshold; and an output reduction warning step of determining whether or not the DPF differential pressure has reached the output reduction threshold, which is larger than the washing request threshold, and issuing an output reduction warning when the DPF differential pressure has reached the output reduction threshold.

According to the first and second inventions, the ash accumulation amount is estimated and calculated from the front-rear differential pressure of the DPF, and therefore signals from a pre-existing differential pressure sensor and so on for performing forcible regeneration control on the DPF can be used instead of providing a new sensor. As a result, a cost increase can be suppressed in comparison with a conventional technique in which an oil sensor is provided to detect an oil level and the ash accumulation amount is calculated by integrating the detected oil level.

Further, in the technique of determining the ash accumulation amount from the DPF differential pressure, the DPF differential pressure does not always increase proportionally with an increase in the ash accumulation amount, and in a condition where no soot has accumulated, the DPF differential pressure substantially does not increase relative to ash accumulation. It is therefore difficult to predict the ash accumulation amount alone from the DPF differential pressure with a high degree of precision. In these inventions, however, an ash washing timing is estimated on the basis of a DPF differential pressure characteristic (see FIG. 3) based on the total accumulation of the preset soot accumulation amount and the ash accumulation amount, whereupon [the ash washing request] is issued. Therefore, by [detecting] the DPF differential pressure, which cannot be detected precisely from the ash accumulation amount alone, using the total accumulation amount of the soot accumulation amount and the ash accumulation amount, variation in the ash accumulation amount included therein can be detected precisely, and as a result, the washing timing can be determined.

The first invention preferably further includes a manual regeneration prompting unit which prompts manual forcible regeneration of the DPF before the ash washing request is issued when the DPF differential pressure has reached the washing request threshold.

By providing the manual forcible regeneration prompting unit which prompts manual forcible regeneration of the DPF before the washing request is issued, the DPF can be forcibly regenerated manually such that the soot is burned and removed. As a result, the DPF differential pressure is temporarily reduced, whereupon the washing request can be issued when the DPF differential pressure reaches the washing request threshold again.

Accordingly, the reliability with which the DPF washing request is issued can be improved. Further, by performing manual forcible regeneration, the timing at which a DPF washing operation is performed at a service station can be adjusted.

When manual forcible regeneration is executed many times, however, an interval between the completion of manual forcible regeneration and issuance of the washing request narrows. In this case, when the DPF differential pressure has reached the washing request threshold again within a predetermined time after the completion of the manual forcible regeneration, the washing request is preferably issued instead of executing the manual forcible regeneration.

When [the interval] becomes narrower than the predetermined time, this means that ash washing is essential, and therefore the washing request is issued without executing manual forcible regeneration. As a result, the reliability with which the washing request is issued can be improved.

Further, so-called oil dilution, in which the engine oil is diluted by the fuel used during forcible regeneration, occurring when forcible regeneration is executed frequently can be prevented.

The first invention preferably further includes an ash accumulation amount estimation unit which estimates the ash accumulation amount in the DPF using an index having a correlative relationship with an engine oil consumption amount, wherein the washing request is output when the DPF differential pressure reaches the washing request threshold even if an estimated value of the accumulation amount calculated by the ash accumulation amount estimation unit has not yet reached the accumulation amount at which washing is required.

By further including and additionally using the ash accumulation amount estimation unit which estimates the ash accumulation amount in the DPF using an index having a correlative relationship with the engine oil consumption amount, the precision with which the ash accumulation amount is estimated can be increased.

As regards additional use of this unit, since ash mainly contains components derived from metal-based additives contained in the engine oil, if the type of used engine oil is changed, it may become difficult to estimate the ash accumulation amount with a favorable degree of precision. However, by preferentially outputting the determination relating to the washing request threshold, which is estimated from the DPF differential pressure, the precision with which the ash washing request is issued can be maintained even when the engine oil is changed.

The first invention preferably further includes a DPF differential pressure correction unit which corrects the differential pressure detected by the differential pressure detection unit to a differential pressure generated in a fixed operating condition, whereby a corrected differential pressure obtained by having the DPF differential pressure correction unit correct the DPF differential pressure is used.

By using the corrected differential pressure, the precision of the accumulation amount estimation can be increased. More specifically, the differential pressure varies according to an exhaust gas volumetric flow rate, even when the accumulation amount remains constant, and therefore the exhaust gas volumetric flow rate at the time of measurement is corrected to a reference gas flow rate in a reference condition, whereupon the differential pressure at the reference gas flow rate is calculated as the corrected differential pressure.

A third invention is a DPF regeneration support system including the DPF regeneration control device according to the first invention, wherein the regeneration control device is connected to an in-vehicle terminal device capable of communicating with an ash management server, the ash management server includes a database storing locations of service stations and calendar information indicating possible operation dates at the respective service stations, and when the washing request is issued by the washing request issuing unit of the regeneration control device, the in-vehicle terminal device obtains, from the ash management server, a closest service station at which ash washing can be performed and calendar information indicating a possible operation date and displays the obtained information on the in-vehicle terminal device.

Preferably in the third invention, the regeneration control device is provided with a manual regeneration prompting unit which prompts manual forcible regeneration of the DPF before the ash washing request is issued when the washing request threshold is reached, and when manual regeneration is executed following a prompt from the manual regeneration prompting unit, a timing at which the washing request threshold is reached again in the future is predicted, whereupon the calendar information indicating a possible operation date is updated and the updated calendar information is displayed.

Further, preferably in the third invention, input of a designated service station and a requested operation date into the in-vehicle terminal device is enabled on the basis of the service stations and the calendar information indicating a possible operation date that have been displayed on the in-vehicle terminal device, and operation request information is transmitted from the in-vehicle terminal device to the ash management server.

Ash, in contrast to soot, does not have carbon as a main component, and instead mainly contains components derived from metal-based additives contained in the engine oil. Therefore, the ash cannot be incinerated by combustion and must instead be washed using compressed air or the like. For this purpose, an operation must be performed in a dedicated service station having a washing facility or using a transportable washing machine.

According to the third invention, the information indicating the closest service station and the calendar information indicating a possible operation date can be obtained on the basis of the information from the ash management server, and the service station and requested operation date can be transmitted from the in-vehicle terminal device to the ash management server. As a result, ash washing can be performed efficiently at the service station.

A fourth invention is a DPF regeneration support system comprising the DPF regeneration control device according to the first invention, wherein the regeneration control device is connected to an in-vehicle terminal device capable of communicating with an ash management server, the ash management server includes a maintenance database in which an amount of ash washed during ash washing and data relating to a cumulative operation time, a cumulative fuel consumption amount, and a cumulative engine rotation speed up to washing are accumulated, the amount of ash washed during washing and the data relating to the cumulative operation time, the cumulative fuel consumption amount, and the cumulative engine rotation speed, read from the regeneration control device, are transmitted from the in-vehicle terminal device and accumulated in the maintenance database of the ash management server, a learning unit is provided to update a relational expression set in the ash accumulation amount estimation unit on the basis of latest accumulated data, and the new updated relational expression is set in the ash accumulation amount estimation unit via the in-vehicle terminal device.

According to the fourth invention, when washing processing is executed, the data indicating the amount of ash washed during ash washing and the cumulative operation time, cumulative fuel consumption amount, and cumulative engine rotation speed up to washing are accumulated in the ash management server, and on the basis of the latest data, the relational expressions set in the ash accumulation amount estimation unit are updated by the learning unit. As a result, the precision with which a subsequent maintenance timing is predicted can be improved. Further, the updated new relational expressions are transmitted from the ash management server to the vehicle side ash accumulation amount estimation unit and set therein via the in-vehicle terminal device, and therefore the relational expressions can be updated using simple control logic without increasing the size of the DPF regeneration control device.

According to the first and second inventions, the ash accumulation amount is estimated and calculated from the front-rear differential pressure of the DPF, and therefore signals from a pre-existing differential pressure sensor and so on for performing forcible regeneration control on the DPF can be used instead of providing a new sensor. As a result, the ash accumulation amount can be estimated while suppressing cost increases, in contrast to a conventional technique in which an oil sensor is provided to detect an oil level and the ash accumulation amount is calculated by integrating the detected oil level.

Further, the ash washing timing is estimated on the basis of a DPF differential pressure characteristic (see FIG. 3) based on the total accumulation of the preset soot accumulation amount and the ash accumulation amount, whereupon [the ash washing request] is issued. Therefore, by [detecting] the DPF differential pressure, which cannot be detected precisely from the ash accumulation amount alone, using the total accumulation amount, variation in the ash accumulation amount included therein can be detected precisely, and as a result, the washing timing can be determined. Thus, the ash accumulation amount can be estimated precisely and the ash washing request can be issued to an operator accurately using a simple method.

According to the third invention, the information indicating the closest service station and the calendar information indicating a possible operation date can be obtained on the basis of the information from the ash management server, and the service station and requested operation date can be transmitted from the in-vehicle terminal device to the ash management server. As a result, ash washing can be performed efficiently at the service station.

According to the fourth invention, the data indicating the amount of ash washed during ash washing and the cumulative operation time, cumulative fuel consumption amount, and cumulative engine rotation speed up to washing are accumulated in the ash management server, and on the basis of the latest data, the relational expressions set in the ash accumulation amount estimation unit are updated by the learning unit. As a result, the precision with which a subsequent maintenance timing is predicted can be improved.

BEST MODES FOR CARRYING OUT THE INVENTION

The present invention will be described in detail below using embodiments shown in the drawings. Note, however, that unless specific description is provided to the contrary, dimensions, materials, shapes, relative arrangements, and so on of constituent components described in the embodiments are not intended to limit the scope of the present invention.

First, referring to FIG. 1, an overall configuration of a DPF regeneration control device applied to a diesel engine will be described.

Figure 1:
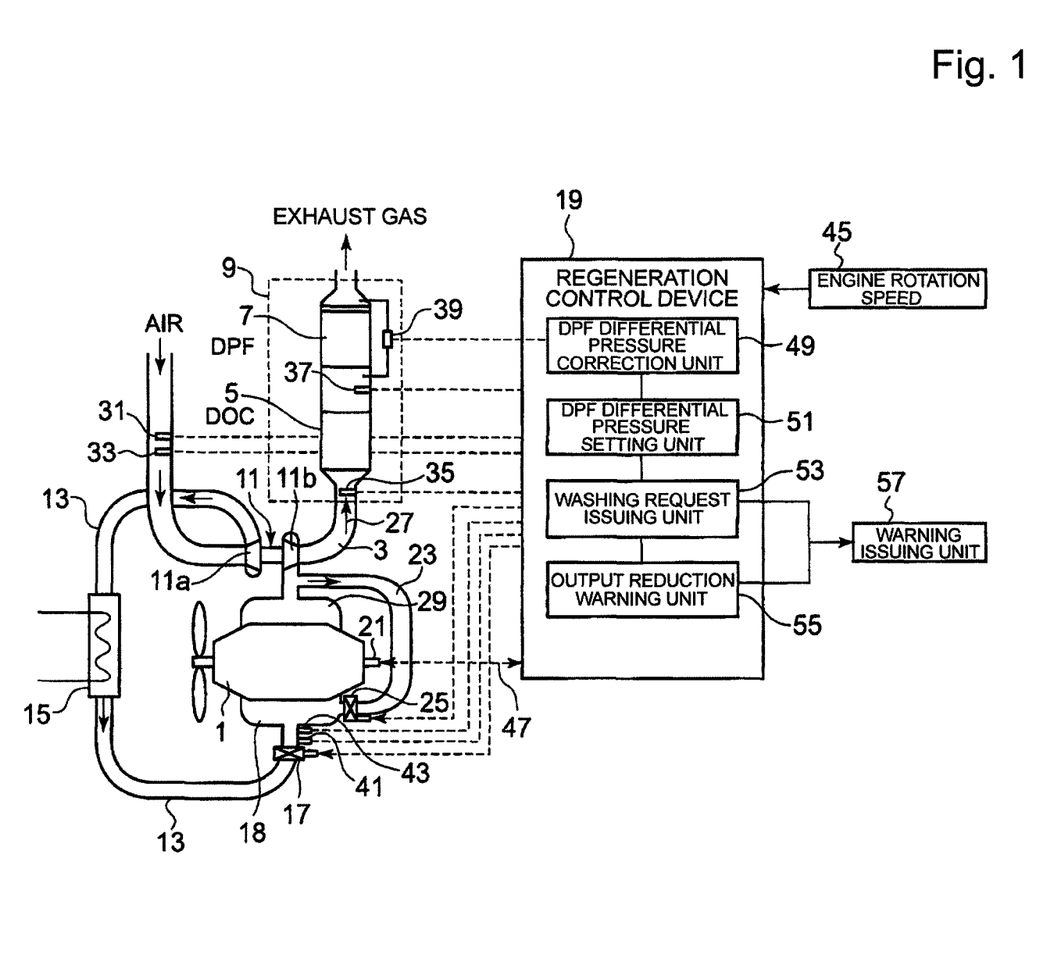
FIG. 1 is an overall constitutional diagram of a diesel engine including a DPF regeneration control device.

As shown in FIG. 1, an exhaust gas after-treatment device 9 constituted by a DOC (front stage oxidation catalyst) 5 and a DPF (diesel particulate filter) 7 that collects PM (exhaust gas particulate matter) on a downstream side of the DOC 5 is provided in an exhaust passage 3 of a diesel engine (to be referred to hereafter as an engine) 1.

The DOC (front stage oxidation catalyst) 5 has a function for rendering hydrocarbon (HC) and carbon monoxide (CO) contained in exhaust gas harmless and oxidizing NO contained in the exhaust gas to $NO_2$ that is used to burn and remove soot collected in the DPF 7, and a function for increasing an exhaust gas temperature using oxidation reaction heat from an unburned fuel component of the exhaust gas during forcible regeneration of the soot collected in the DPF 7.

The engine 1 includes an exhaust gas turbocharger 11 having an exhaust gas turbine 11b and a compressor 11a that is driven coaxially with the exhaust gas turbine 11b. Air discharged from the compressor 11a of the exhaust gas turbocharger 11 passes through an air pipe 13 and enters an intercooler 15, where the intake air is cooled. An intake air flow is then controlled by an intake air throttle valve 17, whereupon the intake air flows from an intake manifold 18 into a combustion chamber, not shown in the drawing, of the engine 1 through an intake port provided for each cylinder.

The engine 1 is also provided with a common rail fuel injection device that injects fuel into the combustion chamber while controlling an injection timing and an injection amount of the fuel. A control signal is input into the common rail fuel injection device from a regeneration control device 19, to be described below, such that a predetermined amount of fuel is supplied from a common rail of the common rail fuel injection device to a fuel injection valve at a predetermined fuel injection timing. A position in which the control signal is input into the common rail fuel injection device is indicated by a reference numeral 21.

Further, an EGR (exhaust gas recirculation) pipe 23 bifurcates from the exhaust passage 3 midway such that a part (EGR gas) of the exhaust gas passes through the EGR pipe 23. The EGR gas is then reduced in temperature by an EGR cooler (not shown) and introduced to a site downstream of the intake air throttle valve 17 via an EGR valve 25.

Combustion gas generated during combustion in the combustion chamber of the engine 1, or in other words exhaust gas 27, passes through an exhaust manifold 29 in which exhaust ports provided for the respective cylinders gather and the exhaust passage 3. The exhaust gas 27 drives the exhaust gas turbine 11b of the exhaust gas turbocharger 11, thereby serving as a power source of the compressor 11a, and then flows through the exhaust passage 3 into the DOC 5 of the exhaust gas after-treatment device 9.

Signals from an air flow sensor 31 that detects a flow rate of air flowing into the compressor 11a, an intake air temperature sensor 33, a DOC inlet temperature sensor 35, a DPF inlet temperature sensor 37, a DPF differential pressure sensor 39, a post-turbocharging intake air temperature sensor 41, and an intake air pressure sensor 43 are taken into the regeneration control device 19 for the DPF 7.

An engine rotation speed signal 45 and a fuel injection amount signal 47 are also taken in.

(First Embodiment)

The regeneration control device 19 according to the present invention will now be described with reference to the above configurations. As shown in FIG. 1, the regeneration control device 19 for the DPF 7 is provided with a DPF differential pressure correction unit 49 which corrects a differential pressure value from the differential pressure sensor 39 that detects a differential pressure between a front and a rear of the DPF 7 to a differential pressure in a fixed operating condition, and a corrected differential pressure is calculated by the DPF differential pressure correction unit 49.

More specifically, the differential pressure varies according to an exhaust gas volumetric flow rate, even at a constant accumulation amount. Therefore, an exhaust gas volumetric flow rate at the time of measurement is corrected to a reference gas flow rate in a reference condition, whereupon a differential pressure at the reference gas flow rate is calculated as the corrected differential pressure. By calculating and using the corrected differential pressure, the precision with which an ash accumulation amount is estimated can be improved.

Figure 3:
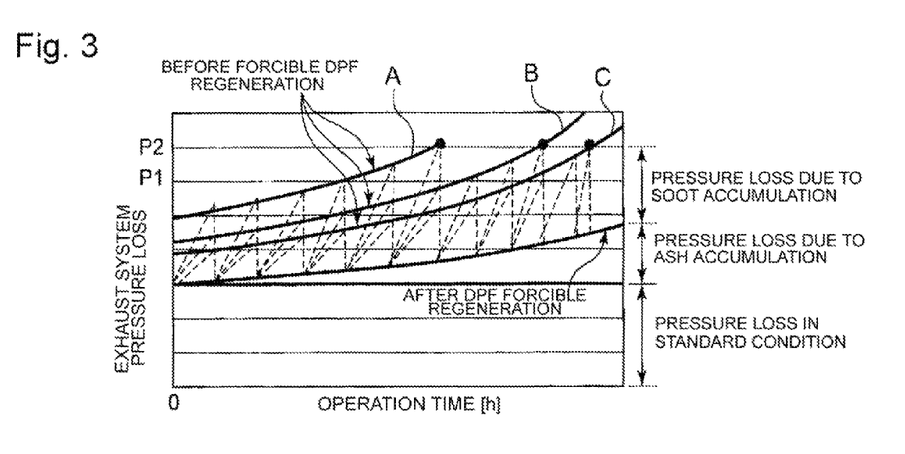
FIG. 3 is an illustrative view showing a relationship between pressure loss caused by soot and pressure loss caused by ash within exhaust system pressure loss.

The regeneration control device 19 is also provided with a DPF differential pressure setting unit 51 which sets a relationship between an operation time and a DPF differential pressure generated in accordance with a total accumulated amount of soot and ash, such as that shown in FIG. 3, in advance through an experiment or a calculation, sets the corrected differential pressure of the DPF 7 generated when the ash accumulation amount corresponds to an accumulation amount at which washing is required, as a washing request threshold, and sets the corrected differential pressure of the DPF 7 generated when the ash accumulation amount is larger than the accumulation amount at which washing is required such that a reduction in output is necessary, as an output reduction threshold.

The regeneration control device 19 also includes a washing request issuing unit 53 which determines whether or not the corrected differential pressure has reached the washing request threshold and outputs a washing request to prompt removal of the ash accumulated in the DPF 7 through washing when the corrected differential pressure has reached the washing request threshold, and an output reduction warning unit 55 which determines whether or not the corrected differential pressure has reached the output reduction threshold, which is larger than the washing request threshold, and issues an output reduction warning when the corrected differential pressure has reached the output reduction threshold, wherein the washing request issuing unit 53 and the output reduction warning unit 55 operate a warning issuing unit 57 such as a lamp or a buzzer.

In the present invention, when washing is not performed in response to the washing request such that the ash exceeds an allowable limit value, the exhaust gas temperature exceeds a limit range and an exhaust gas performance deteriorates. Hence, at or above an allowable corrected differential pressure, a failsafe function is activated to reduce the output gradually. The failsafe function is preferably not activated without any advance warning, and therefore a warning is issued in advance.

Figure 2A:
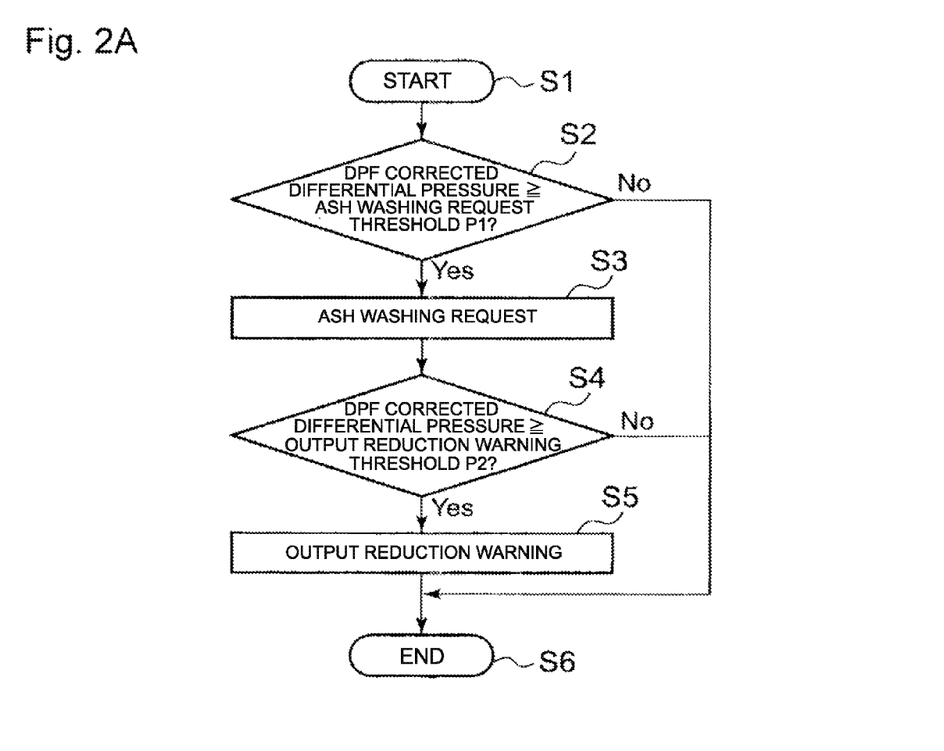
FIG. 2A is a flowchart showing control performed by a DPF forcible regeneration control device according to a first embodiment.

A control flow of the regeneration control device having the above configuration will now be described with reference to FIG. 2A. First, in Step S2, a determination is made as to whether or not the DPF corrected differential pressure equals or exceeds an ash washing request threshold P1. When the DPF corrected differential pressure does not equal or exceed the ash washing request threshold P1, the flow advances to Step S6, where the control is terminated, and when the DPF corrected differential pressure equals or exceeds the ash washing request threshold P1, the flow advances to Step S3, where the ash washing request is issued.

Next, in Step S4, a determination is made as to whether or not the DPF corrected differential pressure equals or exceeds an output reduction warning threshold P2. When the DPF corrected differential pressure does not equal or exceed the output reduction warning threshold P2, the flow advances to Step S6, where the control is terminated, and when the DPF corrected differential pressure equals or exceeds the output reduction warning threshold P2, the flow advances to Step S5, where the output reduction warning is issued. Note that the flow shown in FIG. 2A is executed repeatedly at predetermined period intervals.

Figure 2B:
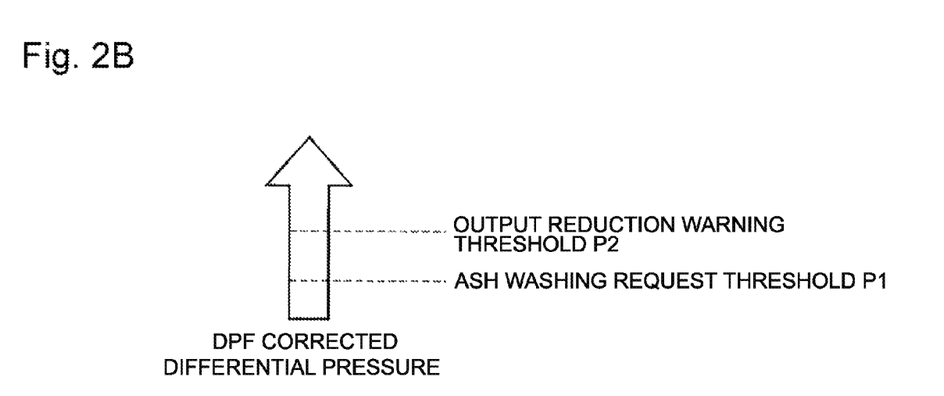
FIG. 2B is an illustrative view of thresholds.

Further, as shown in FIG. 2B, a relationship between the ash washing request threshold P1 and the output reduction warning threshold P2 is P1<P2.

As regards techniques for determining the ash accumulation amount from the front-rear differential pressure of the DPF, the DPF differential pressure does not always increase proportionally with an increase in the ash accumulation amount, and in a condition where no soot has accumulated, the DPF differential pressure substantially does not increase relative to ash accumulation. It is therefore difficult to predict the ash accumulation amount alone from the DPF differential pressure with a high degree of precision. In the first embodiment, however, the ash accumulation amount is estimated on the basis of a DPF differential pressure characteristic (see FIG. 3) corresponding to a total accumulation of a preset soot accumulation amount and the ash accumulation amount, whereupon the washing request and the output reduction warning are issued using a lamp, a buzzer, or the like.

By detecting the DPF differential pressure at the total accumulation amount rather than detecting the ash accumulation amount alone, an increase condition of the ash accumulation amount included in the total accumulation amount can be determined with a high degree of precision, after which requests and warnings can be issued.

Hence, the ash accumulation amount can be estimated precisely and an ash washing request can be issued to an operator accurately using an easy method and without the need to provide a special sensor.

Figure 6:
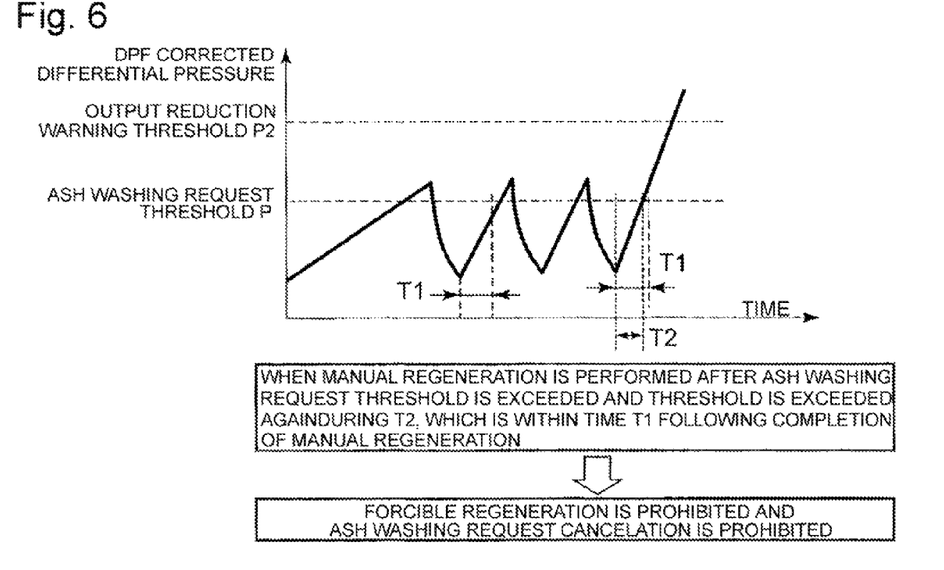
FIG. 6 is an illustrative view showing an operation performed by a manual regeneration prompting unit according to the second embodiment.

FIG. 3 shows a characteristic curve illustrating a relationship between the operation time and an exhaust system pressure loss (the DPF corrected differential pressure) using three types of DPF, namely A, B, and C. The ash washing request threshold P1 and the output reduction warning threshold P2 are set in accordance with the used DPF. Since the output reduction warning threshold P2 affects an engine performance, however, the output reduction warning threshold P2 is set at a fixed value regardless of the type of the used DPF. The ash washing request threshold P1, meanwhile, can be set individually in accordance with a capacity and so on of the DPF, but may also be set at a constant value, as shown by P1 in FIG. 6. Note that dotted lines in FIG. 6 show a condition in which forcible regeneration is executed repeatedly.

(Second Embodiment)

Figure 4:
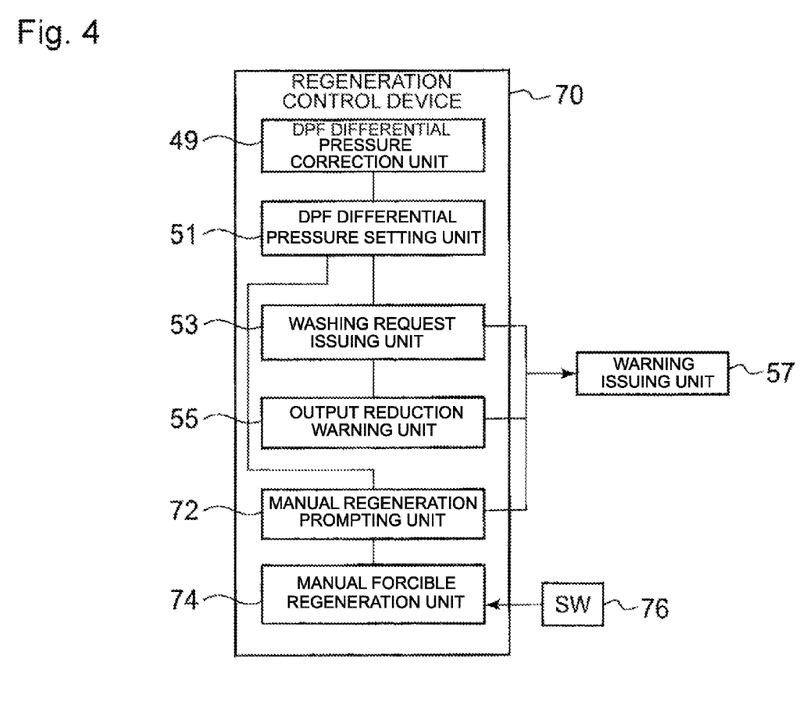
FIG. 4 is a constitutional diagram of a regeneration control device according to a second embodiment.
Figure 5:
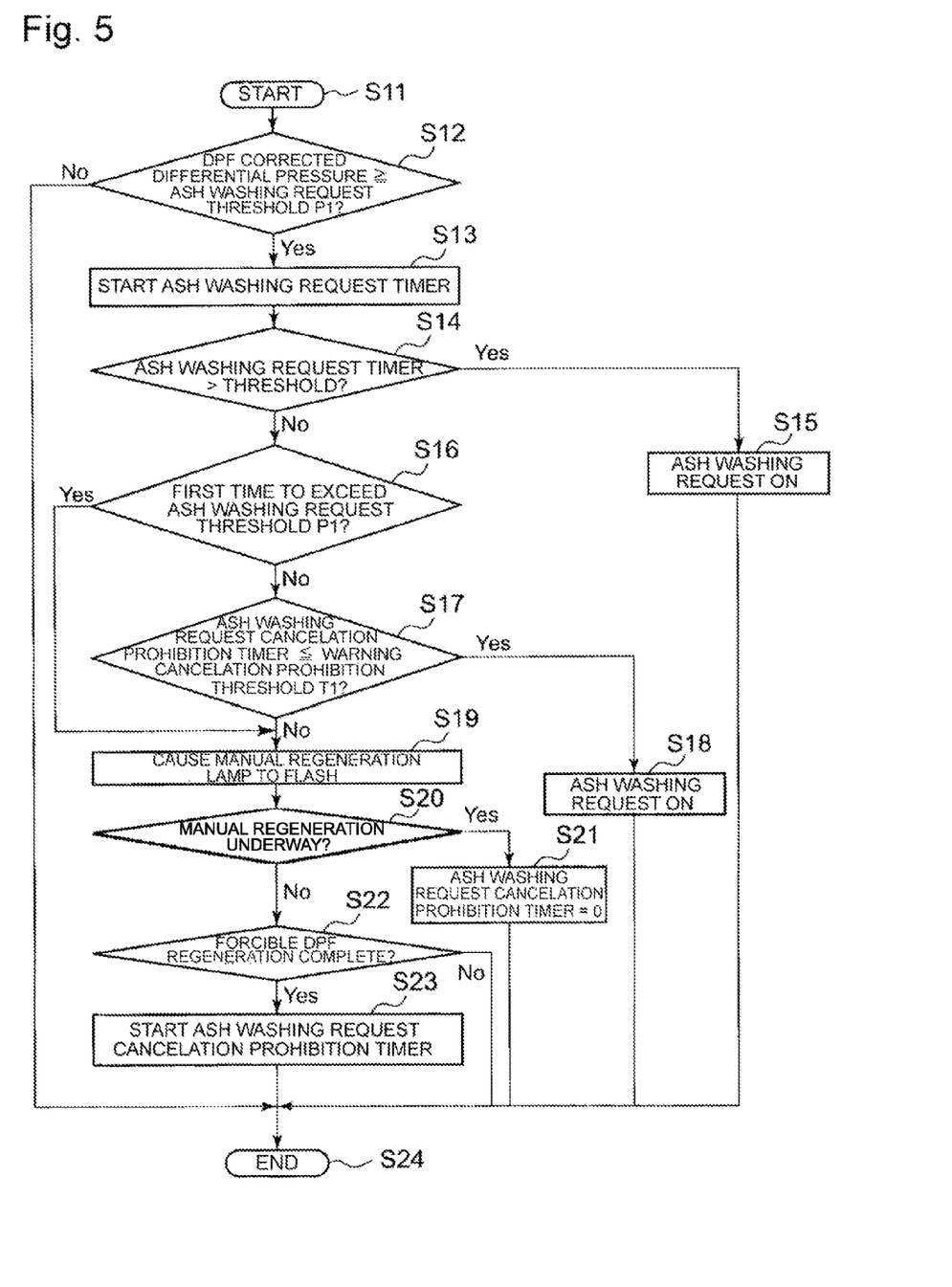
FIG. 5 is a flowchart showing control performed by the regeneration control device according to the second embodiment.

Next, referring to FIGS. 4 to 6, a regeneration control device 70 according to a second embodiment will be described. As shown in FIG. 4, the second embodiment differs from the first embodiment in that a manual regeneration prompting unit 72 and a manual forcible regeneration unit 74 are provided. All other configurations are identical to the first embodiment.

The manual regeneration prompting unit 72 is provided to prompt manual forcible regeneration of the DPF 7 before the ash washing request is issued when the ash washing request threshold P1 is reached. When a switch 76 for executing forcible regeneration is switched ON by the operator in response to a prompt from the manual regeneration prompting unit 72, the manual forcible regeneration unit 74 is activated, whereby forcible regeneration is executed on the DPF 7.

As regards an outline of forcible regeneration control, when forcible regeneration begins, DOC temperature raising control is executed to activate the DOC 5. The DOC temperature raising control is performed by throttling the intake air throttle valve 17, throttling an exhaust valve provided on a downstream side of the DPF 7, implementing an early post injection or the like following a main injection into the combustion chamber, and so on. When the DOC 5 is sufficiently activated, a late post injection is performed at a crank angle (approximately 180 degrees after TDC (top dead center)) that does not contribute to combustion such that the exhaust gas temperature is further increased by oxidation heat generated as the fuel injected into the activated DOC 5 in the late post injection reacts in the DOC 5. When the exhaust gas temperature has been increased to approximately 600° C., at which soot is burned in the DPF 7, the soot is burned and removed.

A control flow of the regeneration control device 70 according to the second embodiment, having the above configuration, will now be described with reference to FIG. 5. First, in Step S12, a determination is made as to whether or not the DPF corrected differential pressure equals or exceeds the ash washing request threshold P1. When the DPF corrected differential pressure does not equal or exceed the ash washing request threshold P1, the flow advances to Step S24, where the control is terminated, and when the DPF corrected differential pressure equals or exceeds the ash washing request threshold P1, the flow advances to Step S13, where an ash washing request timer is started. In Step S14, a determination is made as to whether or not the ash washing request timer exceeds a threshold, and when the ash washing request timer exceeds the threshold, issuance of the ash washing request is switched ON in Step S15. Hence, to prevent erroneous detection, issuance of the ash washing request is not switched ON immediately after the DPF corrected differential pressure is determined to equal or exceed the ash washing request threshold P1, and instead, the ash washing request is issued after a predetermined set time.

When the ash washing request timer does not exceed the threshold, the flow advances to Step S16, where a determination is made as to whether or not the ash washing request threshold P1 has been exceeded for the first time. When the ash washing request threshold P1 has been exceeded for the first time, the flow advances to Step S19, where the manual regeneration prompting unit 72 prompts manual regeneration by causing a manual regeneration lamp (the warning issuing unit 57) to flash. Further, when it is determined in Step S16 that the ash washing request threshold P1 has not been exceeded for the first time, a determination is made in Step S17 as to whether or not an ash washing request cancelation prohibition timer is equal to or lower than a warning cancelation prohibition threshold T1. As shown in Step S23, the ash washing request cancelation prohibition timer is started when forcible regeneration of the DPF 7 is completed. When the ash washing request cancelation prohibition timer is equal to or lower than the warning cancelation prohibition threshold T1 in Step S17, warning cancelation is prohibited in Step S18 such that the ash washing request warning remains ON. When the ash washing request cancelation prohibition timer exceeds the warning cancelation prohibition threshold T1 in Step S17, the ash washing request warning is canceled, whereupon manual regeneration is prompted by causing the manual regeneration lamp to flash.

A part including Steps S16 to S19 will now be described further with reference to FIG. 6. When the ash washing request threshold P1 is exceeded for the first time, the operator is prompted to perform manual regeneration, as shown in Step S19. Manual regeneration is also prompted when a negative determination is made in Step S17, or in other words when manual regeneration is performed after the ash washing request threshold P1 is exceeded and then the ash washing request threshold P1 is exceeded again after the elapse of at least a time corresponding to T1 following the completion of manual regeneration.

However, when the ash washing request threshold P1 is exceeded again during T2, which is within the warning cancelation prohibition threshold T1, so-called oil dilution, in which the engine oil is diluted by the fuel used during forcible regeneration, occurs. Hence, forcible regeneration is prohibited, after which the flow advances to Step S18, where output of the ash washing request is switched ON. In this case, cancelation of the ash washing request is prohibited until ash washing is executed.

Next, in Step S20, a determination is made as to whether or not the operator has operated the switched 76 to execute manual regeneration as a result of the warning issued in Step S19. When it is determined that manual regeneration is underway, the ash washing request cancelation prohibition timer is set to zero in Step S21. In Step S22, a determination is made as to whether or not forcible regeneration of the DPF 7 is complete. When forcible regeneration is not complete, the control is terminated in Step S24, and when forcible regeneration is complete, the ash washing request cancelation prohibition timer is started in Step S23, whereupon the control is terminated in Step S24. Note that the flow shown in FIG. 5 is executed repeatedly at predetermined period intervals.

According to the second embodiment, the manual forcible regeneration prompting unit 72 is provided to prompt manual forcible regeneration of the DPF 7 before the washing request is issued, and therefore the DPF differential pressure can be reduced temporarily by forcibly regenerating the DPF 7 manually to burn and remove the soot therein. When the DPF differential pressure subsequently reaches the washing request threshold again, the washing request can be issued.

Hence, a reliability with which the washing request is issued in relation to the DPF 7 can be improved. Further, by performing manual forcible regeneration, a timing of a DPF washing operation performed at a service station can be adjusted.

When manual forcible regeneration is executed many times, however, an interval between completion of the manual forcible regeneration and issuance of the washing request narrows. In this case, when the washing request threshold is reached again within a predetermined time (the warning cancelation prohibition threshold T1) following completion of the manual forcible regeneration, the washing request is issued without causing the manual regeneration lamp to flash in order to prompt manual forcible regeneration.

When [the interval] becomes narrower than the predetermined time, this means that ash washing is essential, and therefore the washing request is issued without executing manual forcible regeneration. As a result, the reliability with which the washing request is issued can be improved.

Further, so-called oil dilution, in which the engine oil is diluted by the fuel used during forcible regeneration, occurring when forcible regeneration is executed frequently can be prevented.

(Third Embodiment)

Figure 7:
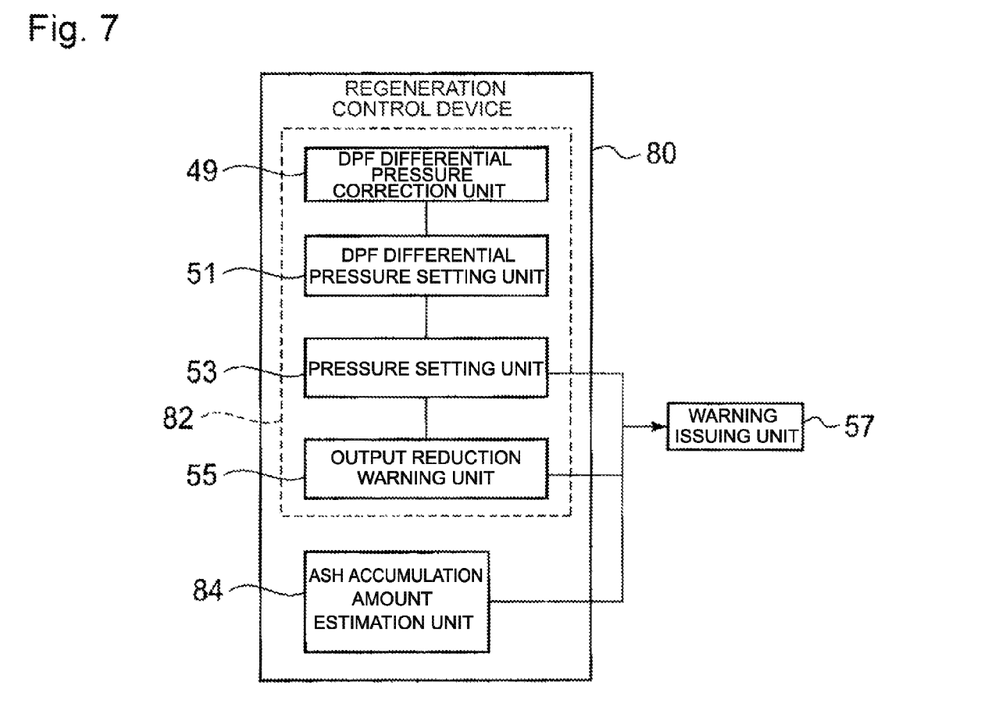
FIG. 7 is a constitutional diagram of a regeneration control device according to a third embodiment.

Next, referring to FIGS. 7 to 10, a regeneration control device 80 according to a third embodiment will be described. As shown in FIG. 7, the third embodiment differs from the first embodiment in that an ash accumulation amount estimation unit 84 is provided. More specifically, in addition to a differential pressure accumulation amount estimation unit 82 constituted by the DPF differential pressure correction unit 49, DPF differential pressure setting unit 51, washing request issuing unit 53, and output reduction warning unit 55 described in the first embodiment, the ash accumulation amount estimation unit 84 is provided to estimate the amount of ash accumulated in the DPF using an index that has a correlative relationship with the engine oil consumption amount. All other configurations are identical to the first embodiment.

Figure 9:
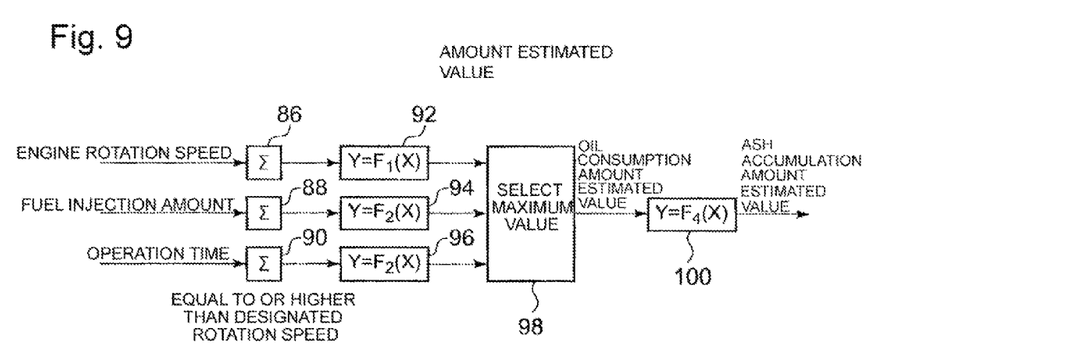
FIG. 9 is a block diagram showing an ash accumulation estimation unit according to the third embodiment.

An overall configuration of the ash accumulation amount estimation unit 84 is as shown in FIG. 9. The ash accumulation amount estimation unit 84 includes an engine rotation speed integration unit 86 which calculates an integrated value of an engine rotation speed at or above a prescribed rotation speed, a fuel consumption amount integration unit 88 which integrates the fuel consumption amount at engine rotation speeds at or above the prescribed rotation speed, and an operation time integration unit 90 which integrates the operation time at engine rotation speeds at or above the prescribed rotation speed.

Further, a first oil consumption amount estimation unit 92 is provided to calculate an oil consumption amount using a predetermined first order relational expression $Y=F_1(X)$ having the integrated value of the engine rotation speed, calculated by the engine rotation speed integration unit 86, as a parameter.

Similarly, a second oil consumption amount estimation unit 94 is provided to calculate an oil consumption amount using a predetermined first order relational expression $Y=F_2(X)$ having the integrated value of the fuel consumption amount, calculated by the fuel consumption amount integration unit 88, as a parameter, and a third oil consumption amount estimation unit 96 is provided to calculate an oil consumption amount using a predetermined first order relational expression $Y=F_3(X)$ having the integrated value of the operation time, calculated by the operation time integration unit 90, as a parameter.

Furthermore, a largest oil consumption amount is selected from the oil consumption amounts calculated using the respective parameters by a largest value selection unit 98 shown in FIG. 9, and an ash accumulation amount calculation unit 100 is provided to calculate an ash accumulation amount estimated value using a calculation expression $Y=F_4(X)$ for calculating the ash accumulation amount from the oil consumption amount.

The engine rotation speed correlates with a number of vertical motions of a piston and the amount of oil supplied to the combustion chamber. Further, when a load is high, the fuel injection amount increases, leading to an increase in a combustion temperature, and as a result, an amount of generated ash increases. The operation time is calculated to supplement the calculation using the engine rotation speed and the calculation using the fuel consumption amount.

The integrated value of the engine rotation speed, the integrated value of the fuel consumption amount, and the integrated value of the operation time correlate with the oil consumption amount, while ash, as described above, mainly contains components derived from metal-based additives contained in the engine oil, and therefore correlates with the engine oil amount. Hence, by estimating the engine oil amount using first order relational expressions corresponding to these parameters, the ash accumulation amount can be estimated.

Note that the first order relational expressions $Y=F_1(X)$, $Y=F_2(X)$, $Y=F_3(X)$, and $Y=F_4(X)$ are calculated in advance through experiments or calculations.

Figure 10:
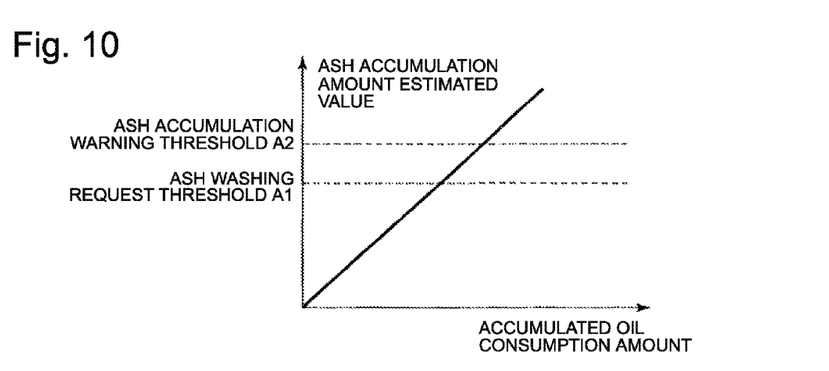
FIG. 10 is an illustrative view showing thresholds according to the third embodiment.

FIG. 10 shows a relationship between an ash washing request threshold A1 and an ash accumulation warning threshold A2 based on the ash accumulation amount calculated by the ash accumulation amount estimation unit 84. When the ash accumulation amount reaches the ash washing request threshold A1, an ash washing request is issued to notify the operator that an ash maintenance timing has arrived. However, when the operator does not perform ash maintenance after the ash washing request threshold A1 is exceeded such that the ash accumulation warning threshold A2 is exceeded, an ash accumulation warning is issued as a failsafe. In other words, an output reduction is performed.

Figure 8:
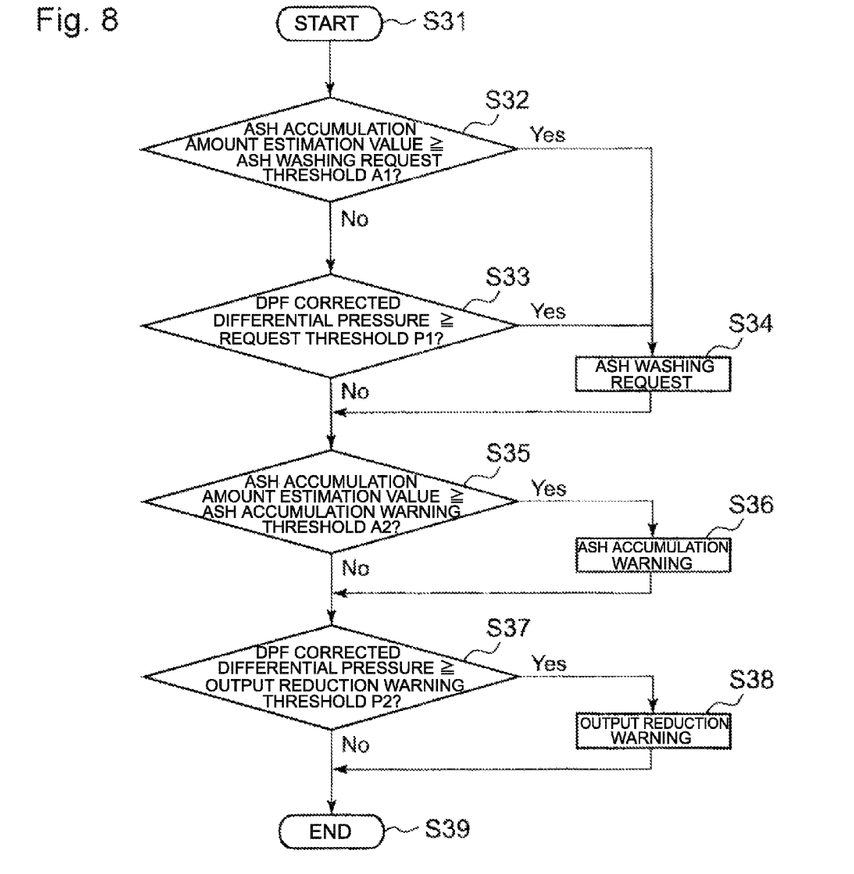
FIG. 8 is a flowchart showing control performed by the regeneration control device according to the third embodiment.

A control flow of the regeneration control device 80 according to the third embodiment, having the above configuration, will now be described with reference to FIG. 8.

First, in Step S32, a determination is made as to whether or not the ash accumulation value calculated by the ash accumulation amount estimation unit 84 has reached or exceeded the ash washing request threshold A1. When the ash accumulation value has reached or exceeded the ash washing request threshold A1, the ash washing request is issued in Step S34. When a negative determination is made in S32, a determination is made in Step S33 as to whether or not the DPF corrected differential pressure calculated by the DPF differential pressure correction unit 49 equals or exceeds the ash washing request threshold P1. When the DPF corrected differential pressure equals or exceeds the ash washing request threshold P1, the ash washing request is issued in Step S34.

Further, when a negative determination is made in Step S33, the flow advances to Step S35, where a determination is made as to whether or not the ash accumulation value calculated by the ash accumulation amount estimation unit 84 has reached or exceeded the ash accumulation warning threshold A2. When the ash accumulation value has reached or exceeded the ash accumulation warning threshold A2, the ash accumulation warning is issued in Step S36. When a negative determination is made in S35, the flow advances to Step S37, where a determination is made as to whether or not the DPF corrected differential pressure equals or exceeds the output reduction warning threshold P2. When the DPF corrected differential pressure equals or exceeds the output reduction warning threshold P2, the output reduction warning is issued in Step S38. When a negative determination is made in Step S37, the flow advances to Step S39, where the control is terminated. Note that the flow shown in FIG. 8 is executed repeatedly at predetermined period intervals.

According to the third embodiment, the ash accumulation amount estimation unit 84 which estimates the ash accumulation amount using an index having a correlative relationship with the engine oil consumption amount is used together with the differential pressure accumulation amount estimation unit 82 which estimates the ash accumulation amount from the differential pressure of the DPF. As a result, the precision with which the ash accumulation amount is estimated can be improved.

As regards combined use of these units, since ash mainly contains components derived from metal-based additives contained in the engine oil, if the type of used engine oil is changed, it may become difficult to estimate the ash accumulation amount with a favorable degree of precision. However, by preferentially outputting the determination relating to the washing request threshold, which is estimated from the DPF differential pressure by the differential pressure accumulation amount estimation unit 82, the precision with which the ash washing request is issued can be maintained even when the engine oil is changed.

In other words, the washing request is output by prioritizing the determination made when the ash accumulation amount estimated using the DPF differential pressure reaches the ash washing request threshold P1, and the determination made when the ash accumulation amount estimated using the DPF differential pressure finally reaches the output reduction warning threshold P2 serves as a final determination.

(Fourth Embodiment)

Figure 11:
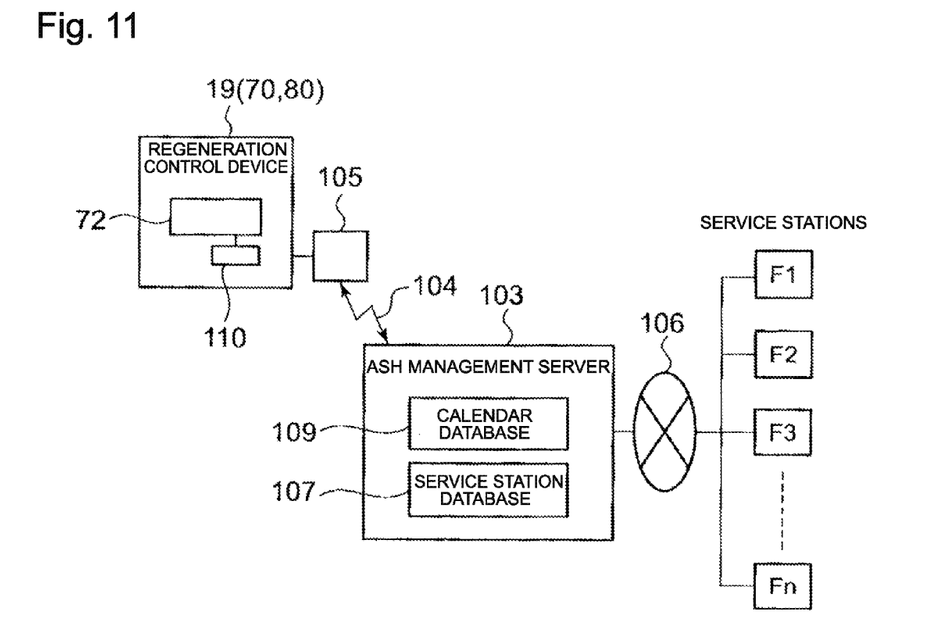
FIG. 11 is an overall constitutional diagram of a fourth embodiment.

Next, referring to FIG. 11, a DPF regeneration support system according to a fourth embodiment will be described. As shown in FIG. 11, the fourth embodiment is configured to include the regeneration control device 19 (70, 80) according to the first to third embodiments, and such that an in-vehicle terminal device 105 capable of communicating with an ash management server 103 can be connected to the regeneration control device 19.

By connecting the in-vehicle terminal device 105 to the regeneration control device 19, the in-vehicle terminal device 105 is connected to the ash management server 103 via a communication network 104. Further, the ash management server 103 is connected to respective service stations (F1, F2, . . . , Fn) in which an ash washing facility is disposed via a communication network 106.

The ash management server 103 includes a service station database 107 storing location data relating to the respective service stations (F1, F2, . . . , Fn), and a calendar database 109 storing calendar information indicating working days of the respective service stations and dates on which an ash washing operation is possible.

When the washing request is issued by the washing request issuing unit 53 of the regeneration control device 19, the in-vehicle terminal device 105 obtains information indicating a closest service station at which ash washing can be performed and calendar information indicating a possible operation date from the ash management server 103, and displays the obtained information on the in-vehicle terminal device 105. The in-vehicle terminal device 105 may be connected to the regeneration control device 19 when the washing request is issued by the regeneration control device 19 or connected to the regeneration control device 19 at all times.

The regeneration control device 19 (70) is also provided with the manual regeneration prompting unit 72 described in the second embodiment, which prompts manual forcible regeneration of the DPF 7 before the ash washing request is issued when the ash washing request threshold P1 is reached. When manual regeneration is executed in response to a prompt from the manual regeneration prompting unit 72, a timing at which the washing request threshold will be reached again is predicted and the operator is notified thereof. The information indicating service stations capable of the operation and the calendar information are then updated by transmitting a result of the predicted timing at which the washing request threshold will be reached again to the ash management server 103, whereupon the updated information is displayed on the in-vehicle terminal device 105.

In other words, the DPF differential pressure can be reduced temporarily by forcible regenerating the DPF 7 manually to burn and remove the soot therein, and while waiting for the washing request issued when the DPF differential pressure reaches the washing request threshold again, the operator can travel to a service station.

The DPF differential pressure setting unit 51 sets the relationship shown in FIG. 3 between the operation time and the DPF differential pressure generated in accordance with the total accumulated amount of soot and ash in advance through an experiment or a calculation, and therefore the timing at which the washing request threshold will be reached again is predicted by having a washing request prediction unit 110 provided in the regeneration control device 19 (70) calculate a future timing at which the washing request threshold will be exceeded again on the basis of this characteristic. The prediction result is provided to the ash management server 103 via the in-vehicle terminal device 105, whereupon the calendar information indicating possible operation dates is updated by the ash management server 103 on the basis of the service station database 107 and the calendar database 109.

Hence, a schedule for traveling to a service station can be adjusted in advance on the basis of the service station and calendar information updated by predicting the timing at which the washing request threshold will be reached again.

Further, a designated service station and a requested operation date can be input from the in-vehicle terminal device 105 on the basis of the service station information and the calendar information indicating possible operation dates displayed on the in-vehicle terminal device 105, and operation request information can be transmitted from the in-vehicle terminal device 105 to the ash management server 103.

Ash, in contrast to soot, does not have carbon as a main component, and instead mainly contains components derived from metal-based additives contained in the engine oil. Therefore, the ash cannot be incinerated by combustion and must instead be washed using compressed air or the like. For this purpose, an operation must be performed in a dedicated service station having a washing facility.

Therefore, by making it possible to obtain the information indicating the closest service station and the calendar information indicating a possible operation date on the basis of the information from the ash management server 103 and transmit the service station and requested operation date from the in-vehicle terminal device 105 to the ash management server 103, ash washing can be performed efficiently at the service station.

(Fifth Embodiment)

Figure 12:
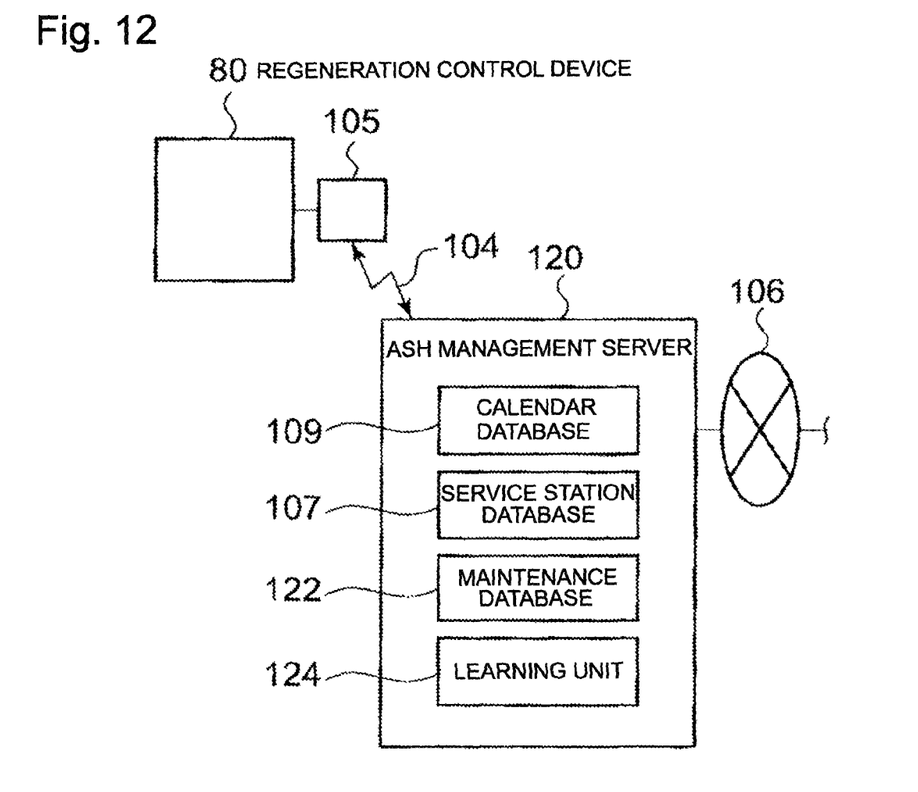
FIG. 12 is a constitutional diagram of an ash management server according to a fifth embodiment.

Next, referring to FIG. 12, a DPF regeneration support system according to a fifth embodiment will be described. As shown in FIG. 12, the fifth embodiment is configured to include the regeneration control device 80 according to the third embodiment, and such that the regeneration control device 80 is capable of communicating with an ash management server 120 via the in-vehicle terminal device 105.

The ash management server 120 includes, in addition to the calendar database 109 and the service station database 107 of the fourth embodiment, a maintenance database 122 and a learning unit 124.

Data indicating an amount of ash washed during ash washing and a cumulative operation time, a cumulative fuel consumption amount, and a cumulative engine rotation speed up to washing are accumulated in the maintenance database 122. These data are input from the in-vehicle terminal device 105 after measuring the amount of ash removed during washing, and the data indicating the cumulative operation time, cumulative fuel consumption amount, and cumulative engine rotation speed up to washing, which are read from the regeneration control device 80, are transmitted from the in-vehicle terminal device 105 to the ash management server 120 and accumulated in the maintenance database 122.

The learning unit 124 is provided to update the relational expressions set in the ash accumulation amount estimation unit 84 on the basis of the latest accumulated data, and the new relational expressions updated by the learning unit 124 are set in the ash accumulation amount estimation unit 84 via the in-vehicle terminal device 105.

The relational expressions updated by the learning unit 124 are the predetermined first order relational expression $Y=F_1(X)$ having the integrated value of the engine rotation speed, calculated by the first oil consumption amount estimation unit 92, as a parameter, the predetermined first order relational expression $Y=F_2(X)$ having the integrated value of the fuel consumption amount, calculated by the second oil consumption amount estimation unit 94, as a parameter, the predetermined first order relational expression $Y=F_3(X)$ having the integrated value of the operation time, calculated by the third oil consumption amount estimation unit 96, as a parameter, and the calculation expression $Y=F_4(X)$ for calculating the ash accumulation amount from the oil consumption amount, as described in the third embodiment.

Hence, when washing processing is executed, the data indicating the amount of ash washed during ash washing and the cumulative operation time, cumulative fuel consumption amount, and cumulative engine rotation speed up to washing are accumulated in the ash management server 120, and on the basis of the latest data, the relational expressions set in the ash accumulation amount estimation unit 84 are updated by the learning unit 124. As a result, the precision with which a subsequent maintenance timing is predicted can be improved. Further, the updated new relational expressions are transmitted from the ash management server 120 to the ash accumulation amount estimation unit 84 and set therein via the in-vehicle terminal device 105, and therefore the relational expressions can be updated using simple control logic without the need to increase the size of the DPF regeneration control device 80.

INDUSTRIAL APPLICABILITY

According to the present invention, an accumulated amount of ash can be estimated with a high degree of precision using a simple method, and an ash washing request can be issued to an operator accurately so that ash washing can be performed efficiently at a service station. Therefore, the present invention is suitable for use in a DPF regeneration control device, a DPF regeneration control method, and a DPF regeneration support system.

The invention claimed is:

1. A DPF regeneration control device for a diesel particulate filter (DPF) that is provided in an exhaust passage and collects exhaust gas particulate matter (PM), the DPF regeneration control device comprising:
   a forcible regeneration unit which forcibly regenerates the PM collected in the DPF;
   a differential pressure detection unit which detects a differential pressure between a front and a rear of the DPF;
   a DPF differential pressure setting unit which sets a DPF differential pressure generated in accordance with a total accumulated amount of soot and ash in advance through an experiment or a calculation, sets a DPF differential pressure generated when an ash accumulation amount corresponds to an accumulation amount at which washing is required, as a washing request threshold, and sets a DPF differential pressure generated when the ash accumulation amount is larger than the accumulation amount at which washing is required such that a reduction in output is necessary, as an output reduction threshold;
   a washing request issuing unit which determines whether or not the DPF differential pressure has reached the washing request threshold and outputs a washing request when the DPF differential pressure has reached the washing request threshold; and
   an output reduction warning unit which determines whether or not the DPF differential pressure has reached the output reduction threshold, which is larger than the washing request threshold, and issues an output reduction warning when the DPF differential pressure has reached the output reduction threshold.

2. The DPF regeneration control device according to claim 1, further comprising a manual regeneration prompting unit which prompts manual forcible regeneration of the DPF before the ash washing request is issued when the DPF differential pressure has reached the washing request threshold.

3. The DPF regeneration control device according to claim 2, wherein, when the DPF differential pressure has reached the washing request threshold again within a predetermined time after the completion of the manual forcible regeneration, the washing request is issued instead of executing the manual forcible regeneration.

4. The DPF regeneration control device according to claim 1, further comprising an ash accumulation amount estimation unit which estimates the ash accumulation amount in the DPF using an index having a correlative relationship with an engine oil consumption amount,
   wherein the washing request is output when the DPF differential pressure reaches the washing request threshold even if an estimated value of the accumulation amount calculated by the ash accumulation amount estimation unit has not yet reached the accumulation amount at which washing is required.

5. The DPF regeneration control device according to claim 1, further comprising a DPF differential pressure correction unit which corrects the differential pressure detected by the differential pressure detection unit to a differential pressure generated in a fixed operating condition.

6. A DPF regeneration control method for a diesel particulate filter (DPF) that is provided in an exhaust passage and collects exhaust gas particulate matter (PM), using a forcible regeneration unit which forcibly regenerates the PM collected in the DPF, the DPF regeneration control method comprising:
   a washing request issuing step of setting a DPF differential pressure generated in accordance with a total accumulated amount of soot and ash in advance through an experiment or a calculation,
   setting a DPF differential pressure generated when an ash accumulation amount corresponds to an accumulation amount at which washing is required, as a washing request threshold,
   setting a DPF differential pressure generated when the ash accumulation amount is larger than the accumulation amount at which washing is required such that a reduction in output is necessary, as an output reduction threshold, and
   determining whether or not the DPF differential pressure has reached the washing request threshold and outputting a washing request when the DPF differential pressure has reached the washing request threshold; and
   an output reduction warning step of determining whether or not the DPF differential pressure has reached the output reduction threshold, which is larger than the washing request threshold, and issuing an output reduction warning when the DPF differential pressure has reached the output reduction threshold.

7. A DPF regeneration support system comprising the DPF regeneration control device according to claim 1,
   wherein the regeneration control device is connected to an in-vehicle terminal device capable of communicating with an ash management server,
   the ash management server includes a database storing locations of service stations and calendar information indicating possible operation dates at the respective service stations, and
   when the washing request is issued by the washing request issuing unit of the regeneration control device, the in-vehicle terminal device obtains, from the ash management server, a closest service station at which ash washing can be performed and calendar information indicating a possible operation date and displays the obtained information on the in-vehicle terminal device.

8. The DPF regeneration support system according to claim 7, wherein the regeneration control device is provided with a manual regeneration prompting unit which prompts manual forcible regeneration of the DPF before the ash washing request is issued when the washing request threshold is reached, and     when manual regeneration is executed following a prompt from the manual regeneration prompting unit, a timing at which the washing request threshold is reached again in the future is predicted, whereupon the calendar information indicating a possible operation date is updated and the updated calendar information is displayed.

9. The DPF regeneration support system according to claim 7, wherein input of a designated service station and a requested operation date into the in-vehicle terminal device is enabled on the basis of the service stations and the calendar information indicating a possible operation date that have been displayed on the in-vehicle terminal device, and operation request information is transmitted from the in-vehicle terminal device to the ash management server.

10. A DPF regeneration support system comprising the DPF regeneration control device according to claim 4,     wherein the regeneration control device is connected to an in-vehicle terminal device capable of communicating with an ash management server,     the ash management server includes a maintenance database in which an amount of ash washed during ash washing and data relating to a cumulative operation time, a cumulative fuel consumption amount, and a cumulative engine rotation speed up to washing are accumulated, the amount of ash washed during washing and the data relating to the cumulative operation time, the cumulative fuel consumption amount, and the cumulative engine rotation speed, read from the regeneration control device, are transmitted from the in-vehicle terminal device and accumulated in the maintenance database of the ash management server, a learning unit is provided to update a relational expression set in the ash accumulation amount estimation unit on the basis of latest accumulated data, and the new updated relational expression is set in the ash accumulation amount estimation unit via the in-vehicle terminal device.

\* \* \* \* \*